June 6, 1933.   R. S. JACOBSEN   1,913,118
VARIABLE SPEED TRANSMISSION
Filed April 23, 1931   3 Sheets-Sheet 1

Inventor
Richard S. Jacobsen
By Arthur F. Durand
Atty.

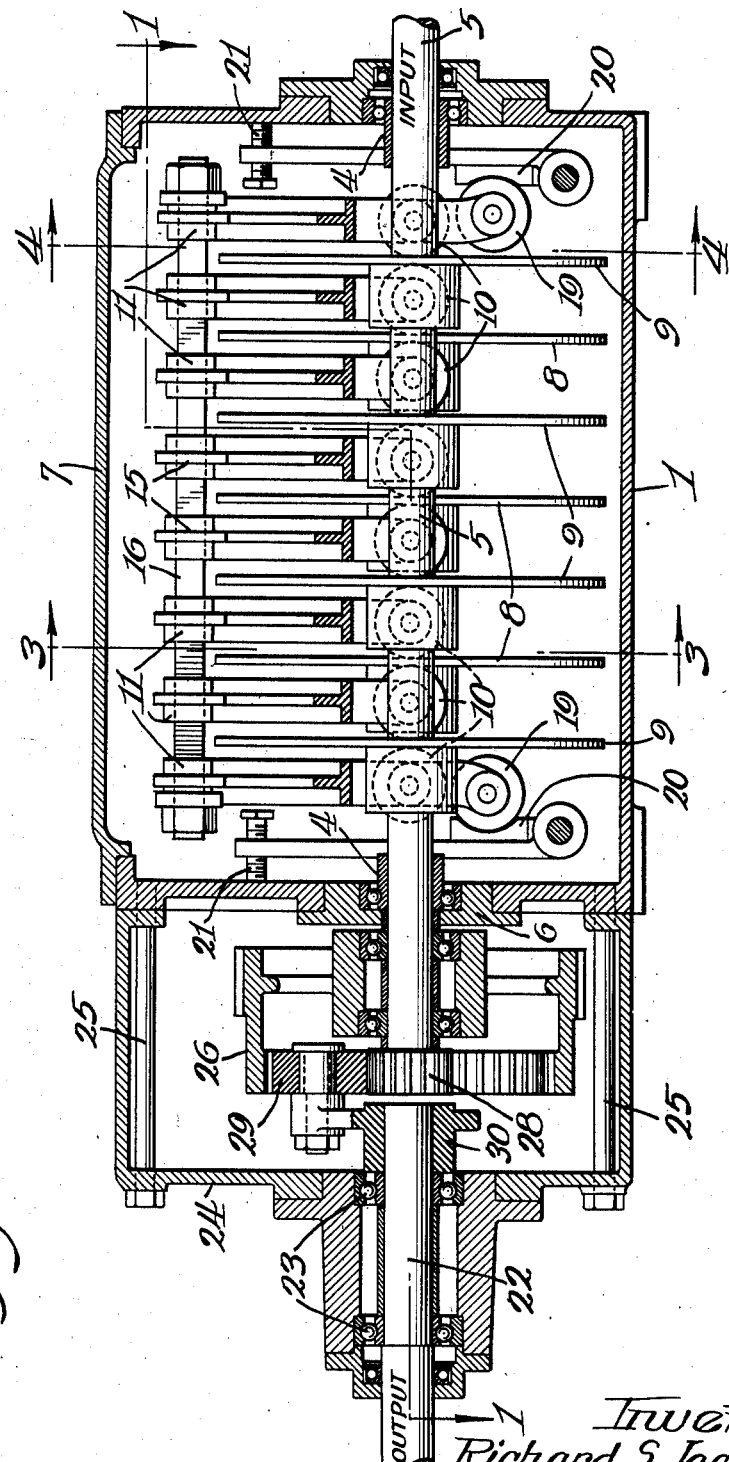

June 6, 1933.  R. S. JACOBSEN  1,913,118
VARIABLE SPEED TRANSMISSION
Filed April 23, 1931  3 Sheets-Sheet 3
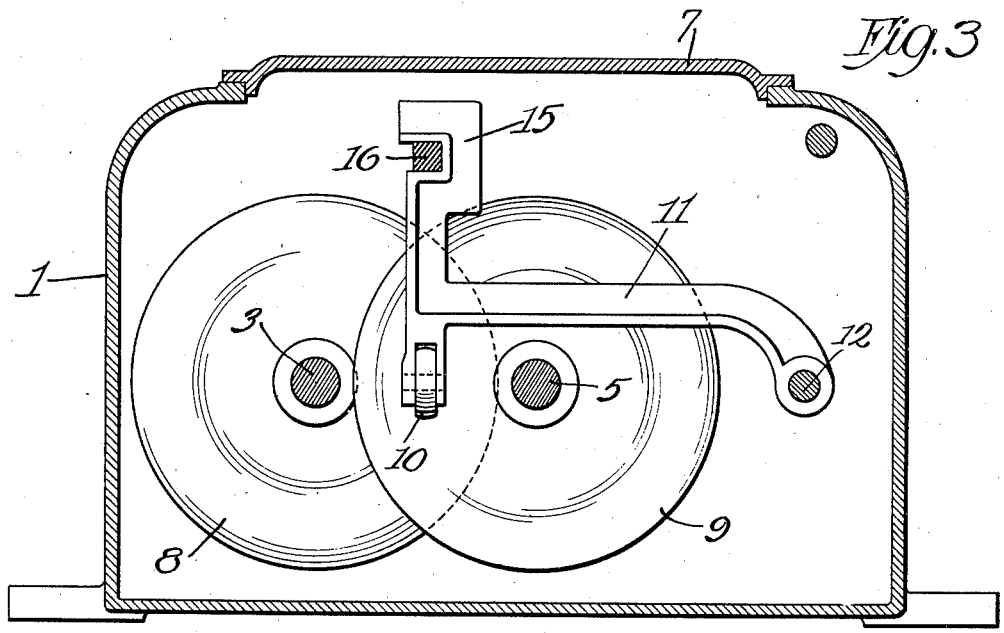
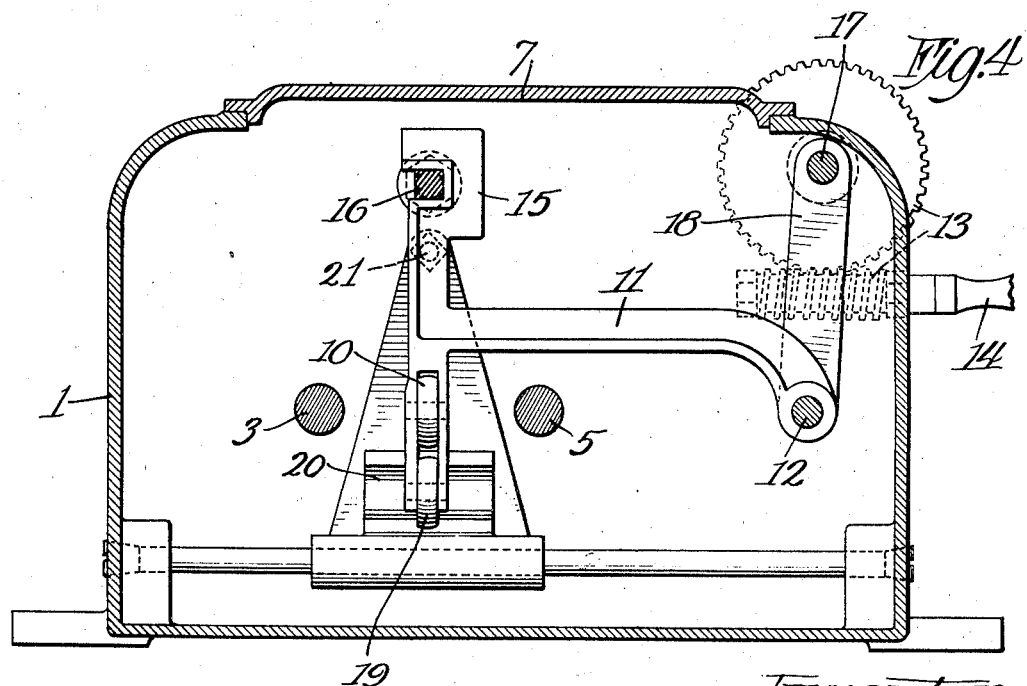
Inventor:
Richard S. Jacobsen
By Arthur F. Durand Atty.

Patented June 6, 1933

1,913,118

UNITED STATES PATENT OFFICE

RICHARD S. JACOBSEN, OF WHEATON, ILLINOIS, ASSIGNOR TO J. F. S. COMPANY, OF CHICAGO, ILLINOIS, A CORPORATION OF ILLINOIS

VARIABLE SPEED TRANSMISSION

Application filed April 23, 1931. Serial No. 532,147.

This invention relates to change speed friction drive transmission, and more particularly to transmissions of this kind in which a plurality of flat disks are arranged in overlapping relation, to rotate about parallel axes, with friction rollers or idlers disposed between the disks of one axis and the disks of another axis, and with means for moving said rollers or idlers relatively to the disks, thereby to, in effect, change the ratio of the drive and vary the speed of transmission.

Generally stated, the object of the invention is to provide a novel and improved construction and arrangement whereby the friction disks and rollers are more effectively crowded together, in the operation of the transmission, thereby to prevent slippage, and especially so under heavy loads.

It is also an object to provide an improved construction and arrangement whereby, in a friction disk and roller variable transmission of this kind, the input shaft and the output shaft are in alignment through the medium of gearing interposed between the axis of one set of disks and the axis of another set of disks, which gearing also forms a connection between the input shaft and the output shaft.

It is also an object to provide certain details and features of construction and combinations tending to increase the general efficiency and the desirability of a friction drive variable speed transmission of this particular character.

To the foregoing and other useful ends, the invention consists in matters hereinafter set forth and claimed and shown in the accompanying drawings, in which—

Fig. 2 is a vertical longitudinal section on line 2—2 in Fig. 1 of the drawings;

Fig. 3 is a transverse section on line 3—3 in Fig. 2 of the drawings;

Fig. 4 is a transverse section on line 4—4 in Fig. 2 of the drawings.

Figure 1:
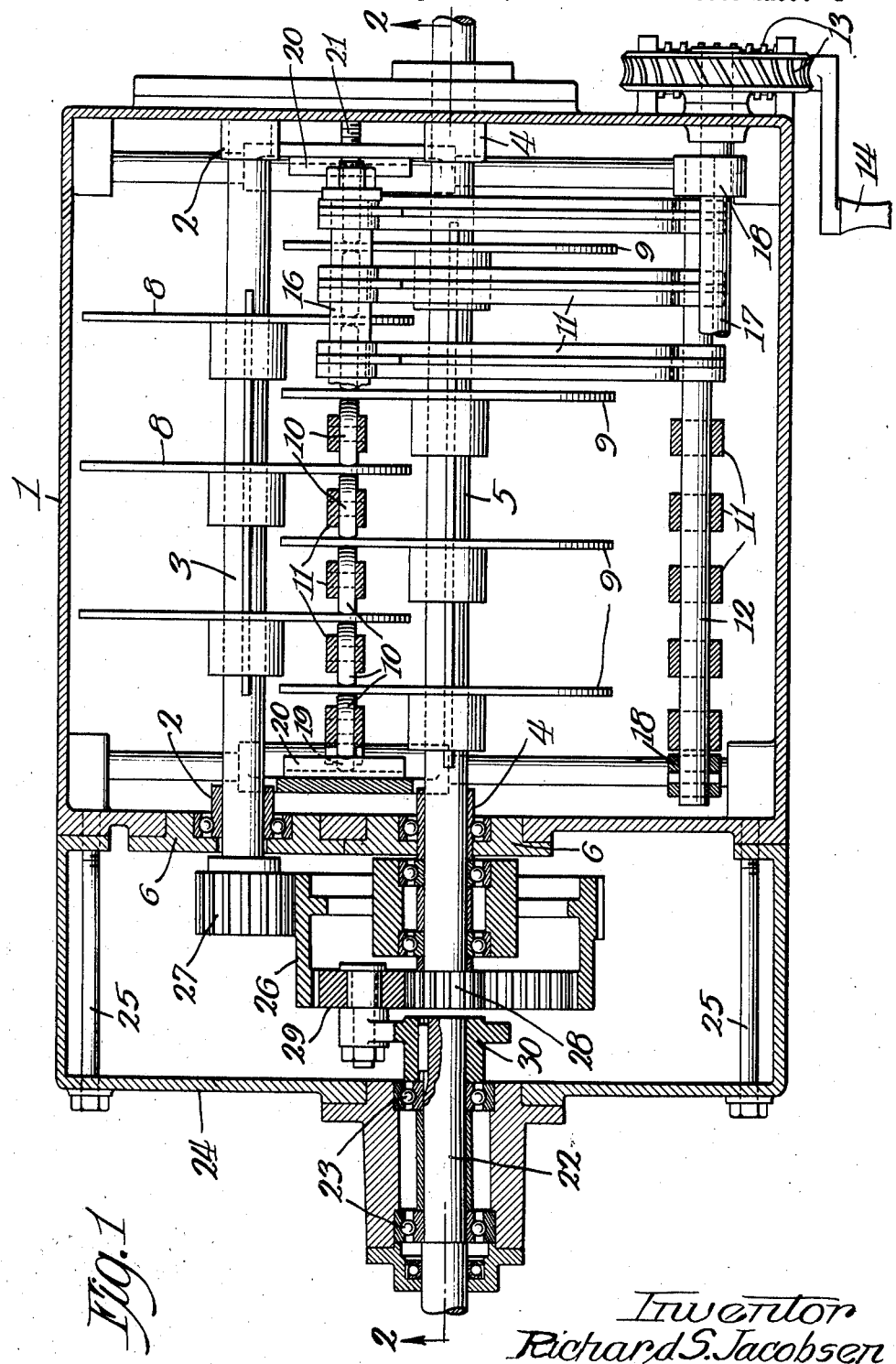
Fig. 1 is a horizontal section on line 1—1 in Fig. 2 of the drawings, with certain portions shown in plan, of a variable speed friction transmission involving the principles of the invention.

As thus illustrated, the invention comprises a suitable casing 1, having bearings 2 at each end thereof, for the shaft 3, and having bearings 4 at each end thereof for the shaft 5, which shafts are in the same horizontal plane. Heads or end walls 6 are provided at each end of the casing, which can be taken out to open the casing at opposite ends thereof, when such is necessary or desirable. There is also a top plate or cover 7 which is removable, in order to afford access to the mechanism within the casing.

The shafts 3 and 5 are friction drive connected together by disks 8 splined on the shaft 3, and by similar disks 9 splined on the shaft 5, with friction rollers or idlers 10 interposed between the disks in the manner shown. Said rollers or idlers 10 are carried by arms 11, loose on the shaft 12, which latter is adapted to be shifted by the worm gearing 13, which has a crank handle 14 for the operation thereof. The arms 11 are provided with upper portions 15, which are engaged by an alignment bar 16, whereby all of the arms 11 will be moved horizontally in unison when the shaft 12 is moved substantially horizontally. The rock shaft 17 has arms 18 fixed thereon, the lower ends of said arms being rigid with the shaft 12, which latter is in turn loose in the arms 11 previously mentioned. The shaft or rod 12, therefore, is adapted to swing on the line of a circle struck from the axis of the rock shaft 17 above, whereby in effect, the idlers 10 are moved either toward the shaft 3 or toward the shaft 5, thus changing the ratio of drive or transmission between these two shafts. When the arms 18 swing slightly to the left, as shown in Fig. 4, the idlers 10 move horizontally in one direction, and when said arms move in the opposite direction, said idlers move slightly horizontally in the opposite direction. The two end arms 11 are provided with rollers 19 for engaging the cams 20, which latter are adjustable by means of the set screws 21, whereby slight upward and downward movement of the rollers or idlers 10, caused by the action of the disks, is accompanied by a cam action that causes the rollers and disks to be crowded more tightly together, thus preventing slippage. This, it will be seen, is because the extreme end arms 11, which have the rollers 19, also each have one of the rollers 10, previously mentioned, and these particular rollers 10 engage the outer sides of the extreme end disks 9, whereby the cam action causes the said additional rollers 10 to crowd all of the disks and rollers more tightly together. Said cams 20 are formed to act as horizontal guides for the rollers 19, when the gearing 13 is operated. The rollers 10 have an inclination to climb or descend, according to the direction of rotation of the disks, when a load is imposed on the output shaft.

The shaft 22 is disposed in bearings 23, supported by the supplemental casing 24, which latter is removably secured by bolts 25 to the main casing 1, previously mentioned. It will be seen that the shaft 22 is preferably in alignment with the shaft 5, previously mentioned. An external and internal gear 26 is mounted to rotate loosely on the shaft 5, as shown in Figs. 1 and 2 of the drawings. The shaft 3 has a pinion 27 that engages the external gear teeth of the gear 26, and the shaft 5 has a pinion 28 that engages the planetary gears 29, that in turn engage the internal teeth of the gear 26, in the manner shown. The planetary gears 29, it will be seen, are carried on the arms of a spider 30, keyed on the shaft 22, and with this arrangement the shaft 5 can be used as the input shaft, and the shaft 22 as the output shaft. With the planetary gearing shown, it follows that there will be a division of the transmission from the shaft 5 to the shaft 22, part of the load drive being transmitted from the shaft 5 through the pinion 28 and the gears 29 and the spider 30 to the shaft 22, and a part of the drive being from the shaft 5, through the disks 8 and 9 and the rollers 10, to the jack shaft 3, and from the latter through the pinion 27 and the gear 26 and the gears 29 to the shaft 22, whereby load drive is not entirely through the jack shaft 3, but is, to a large extent, directly from the shaft 5 through the said gearing to the shaft 22, in the manner explained. It follows that the shaft 5 and the gear 26 will rotate in opposite directions, but at different speeds, which differential action is permitted by the planetary gears 29, in a manner that will be readily understood. This will vary according to the relative speeds of the shafts 3 and 5, and according to the adjustment of the rollers or idlers between the disks.

In this way, therefore, the input and output shafts 5 and 22 are in alignment with each other, and, in addition, means are provided for crowding the disks and the idlers more tightly together, by the action of the instrumentalities for adjusting the positions of the rollers or idlers, whereby slippage is prevented, and the possibility of lost motion between the said input shaft and the output shaft is precluded, or greatly reduced.

It will also be seen that the rollers 10 are relatively movable about a single fixed axis, the axis of the shaft 12, in order to change their positions between the disks, thereby to vary the ratio and the speed of transmission from the input shaft to the jack shaft, in the manner explained. The rollers 10 thus have axes of rotation that are not fixed, but which have a shifting movement in unison. It is in this way that the rollers 10 not only have movement toward the shaft 3, or toward the shaft 5, but also have some movement crosswise of or at an angle to the plane of the two shafts, with a consequent shifting of the axes of the rollers 10, inasmuch as the shaft rod 12 travels on the line of a circle, whereby the axes of the rollers 10 have a tilting motion, in order to change the ratio or speed of transmission.

Thus, it will be seen that the input shaft 5 and the output shaft 22 rotate in opposite directions, when the rollers 10 are in center position between the input shaft and the jack shaft. If the rollers 10 are moved toward the jack shaft 3, the ratio will be changed to drive the jack shaft 3 faster, and consequently the output shaft 22 will be driven faster, and hence the input shaft 5 and the output shaft 22 always rotate in opposite directions, at different relative speeds, for any adjustment of the rollers 10 from their center position shown in Fig. 3 toward the jack shaft 3, thereby to increase the speed of the output shaft. However, when the rollers 10 are moved toward the input shaft 5, the speed of the shaft 3 is reduced, and if the adjustment continues, a point will be reached where the shaft 3 will slow down sufficiently, so that there will be no motion whatever of the output shaft. Thereafter, if the rollers 10 are moved closer to the shaft 5, the result will be that the output shaft 22 will start rotating in the opposite direction, so that it will then rotate in the same direction as the input shaft, and in this way the transmission serves also as a reversing gear to reverse the rotation of this output shaft. Therefore, as shown, the cams 20 are trough-shape in cross section, as shown more clearly in Fig. 2, whereby a cam action is insured whether the rollers 10 are endeavoring to climb upwardly or to climb downwardly, for under either condition the rollers 19 will be automatically crowded toward each other by the same action, caused by the shifting movement of the rollers 10, with the result that the disks and friction rollers will automatically be crowded more tightly together, as the load increases, thereby preventing slippage in the friction transmission. With this construction and mode of operation, a substantial range of speed is obtained, and a comparatively high speed with substantial power is obtained. The shafts 3 and 5, of course, rotate in the same direction, inasmuch as the transmission from the shaft 5 to the shaft 3 is through the idlers 10, whereby the two shafts 3 and 22 rotate at a variable speed, for any given speed of the input shaft 5, it being contemplated that the latter will be driven at some fixed given speed, by a motor or engine or power means of any suitable or desired character.

It will be seen, therefore, that the friction transmission is adjustable not only to vary the speed of transmission, but also to reverse the direction of rotation of the output.

It will be seen that the rollers or idlers 10, and even the cam rollers 19, are subject to wear, especially if made of softer metal than the disks. Therefore, to facilitate repairs, and the substitution of a fresh roller for a worn or distorted roller, the cover 7 can be removed, and the liner shaft 16 can be removed from engagement with the portions 15, and when this has been done, any one of the arms 11 can be pulled upwardly so that the worn roller will be brought into an accessible position above the top of the casing or housing, so that such roller can be slipped out of place and a new one substituted therefor. This, for example, could be done by using pin bearings for the rollers with the pins having a driving fit in the arms 11, and with the rollers loose on the pins. Thus, as shown and described, any roller can be taken out, separately, without disturbing any of the other rollers, and this is of considerable importance in a change speed friction transmission of this character, as it facilitates and reduces the expense of repairs. It will be understood, of course, that the casing or housing can be filled with lubricating oil to keep the various parts well lubricated.

The slight up and down displacement of the shaft 12, as stated, will result in a slight tilting of the axes of the rollers 10, but obviously not enough to interfere with the proper functioning of these rollers. Thus the means for controlling the rollers 10 are operable about a plurality of axes, 12 and 17, extending parallel with the shafts.

What I claim as my invention is:

1. A variable speed friction transmission comprising an input shaft adapted to be operated by power, a jack shaft, a series of flat friction disks on each shaft, in staggered relation, friction rollers or idlers between the disks on one shaft and the disks on the other shaft, means whereby said rollers or idlers are shifted to change the ratio and the speed of transmission from the input shaft to the jack shaft, automatic means operable by the load resistance for crowding the disks and rollers more tightly together with increasing pressure by a different shifting movement of said rollers for causing the pressure to increase automatically as the load resistance increases, and output instrumentalities connected to said jack shaft to receive the load.

2. A structure as specified in claim 1, said automatic means comprising stationary cams and movable rollers engaging said cams, together with means whereby these movable rollers exert pressure toward each other upon the outer sides of the two outermost disks of said series.

3. A structure as specified in claim 1, said automatic means comprising stationary cams and movable rollers engaging said cams, together with means for adjusting the positions of said cams, and additional rollers controlled by said movable rollers and engaging the outer sides of the two extreme end disks of said series.

4. A structure as specified in claim 1, said automatic means comprising rollers bearing against the outer sides of the two extreme end disks.

5. A structure as specified in claim 1, said output means comprising an output shaft in alignment with said input shaft.

6. In a change speed friction transmission, the combination of parallel shafts, friction disks splined on said shafts, the disks of one shaft extending between the disks of the other shaft, a series of friction rollers interposed between the disks of one shaft and the disks of the other shaft, means for moving the rollers in the direction of their parallel axes, toward one shaft or the other, to change the ratio or speed of transmission from one shaft to the other, and mechanism for crowding the disks and rollers more tightly together, as the load increases, said mechanism including arms pivoted at their ends, thereby mounted for adjustment about parallel axes extending at right angles to the shafts, screws for adjusting said arms, cams on said arms, and rollers for engaging said cams, said cam-engaging rollers being connected to the two friction rollers at the ends of the series, thereby to move in unison with all of the disk-engaging rollers.

7. In a change speed friction transmission, the combination of parallel shafts, disks on said shaft, the disks of one shaft extending between the disks of the other shaft, a series of arms disposed in a common plane and extending between the disks of one shaft and the disks of the other shaft, a common axis for said arms, providing a shifting axial support for the outer ends of said arms, means forming a stationary axis for supporting said shifting axis, friction rollers on said arms engaging said disks and having parallel axes always intersecting said common axis of the arms, means for moving said shifting axis about said stationary axis to shift said rollers, thereby to change the ratio or speed of transmission from one shaft to the other, the parallel axes of said rollers extending at right angles to said shafts, whereby the shifting movement of said rollers is toward one or the other of said shafts, and guiding means for keeping said rollers in the plane of said shafts.

8. A structure as specified in claim 7, said guiding means comprising cams, with rollers engaging said cams, said cam engaging rollers being supported by the outermost arms of said series, whereby said cams and cam-engaging rollers co-operate to force the disks and disk-engaging rollers more tightly together when the load increases.

9. A structure as specified in claim 7, and a liner bar detachably engaging all of said arms, rigidly engaging each arm.

10. A structure as specified in claim 7, comprising means whereby each arm is individually displaceable by swinging movement from its operative position.

11. A structure as specified in claim 7, comprising means whereby each arm is individually displaceable by swinging movement from its operative position, together with the rigid liner rigidly and detachably engaging all of said arms.

12. In a change speed friction transmission, the combination of parallel shafts, disks splined on said shafts, means having friction rollers interposed between the disks of the one shaft and the disks of the other shaft, outside rollers engaging only the outermost disks, and automatic cam means for causing these other rollers to crowd said disks and first-mentioned rollers more tightly together when the load increases.

13. A structure as specified in claim 12, comprising pivoted arms for supporting said rollers, means forming a common shifting axis for said arms, and means for moving said shifting axis to shift the disk-engaging rollers in the direction of their axes.

14. A structure as specified in claim 12, comprising pivoted arms for supporting said rollers, means forming a common shifting axis for said arms, and means for moving said shifting axis to shift the disk-engaging rollers in the direction of their axes, causing a tilting motion of the roller axes, together with detachable means for rigidly holding said arms in alignment, but permitting individual displacement of any arm from its operative position.

Specification signed this 27th day of March, 1931.

RICHARD S. JACOBSEN.